Figure 1:
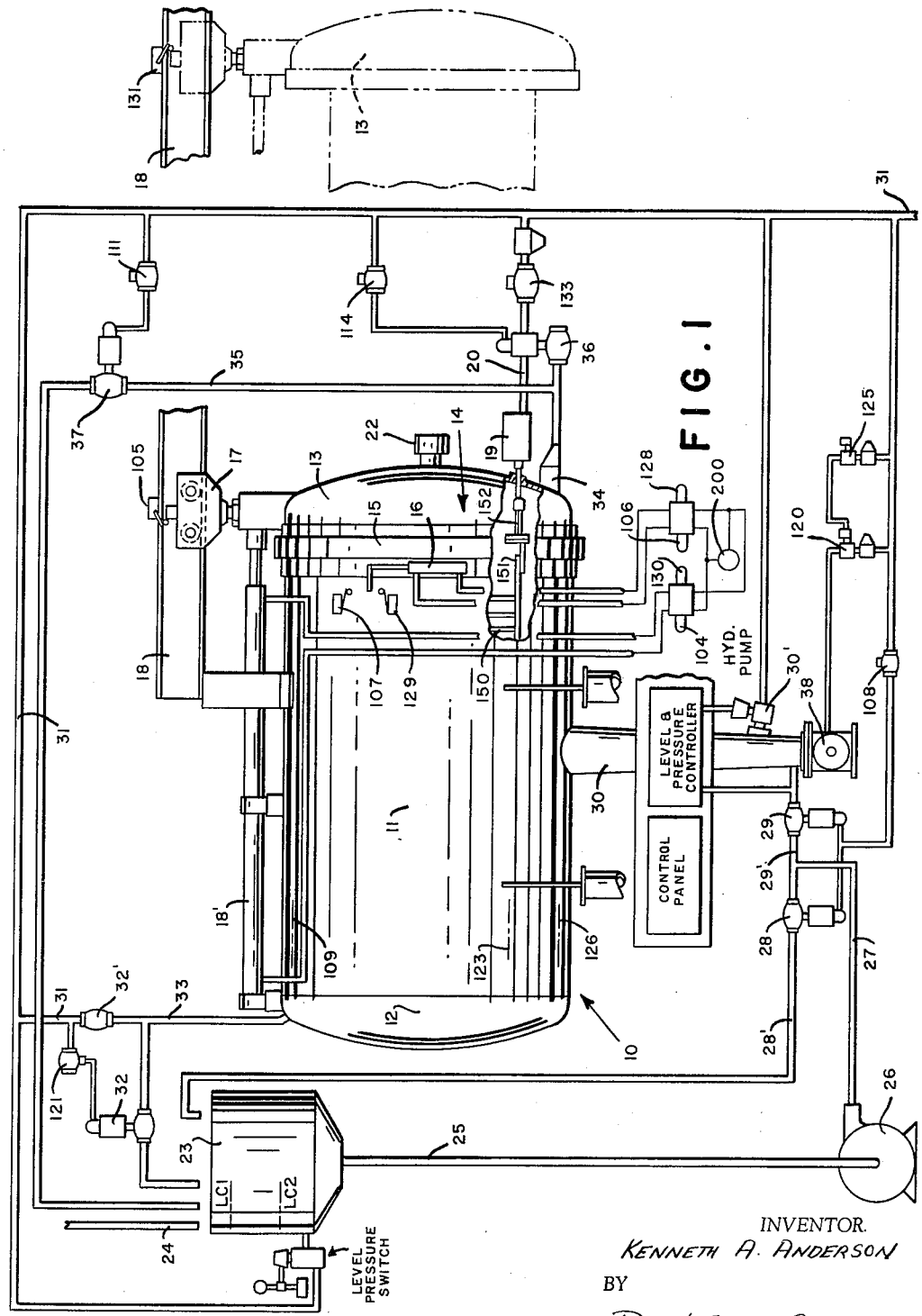

INVENTOR.
KENNETH A. ANDERSON
BY
Robertson + Smythe
ATTORNEYS.

United States Patent Office 3,212,639
Patented Oct. 19, 1965

3,212,639
FILTER
Kenneth A. Anderson, Silvis, Ill., assignor to Ametek, Inc., New York, N.Y., a corporation of Delaware
Filed Nov. 19, 1962, Ser. No. 238,496
7 Claims. (Cl. 210—104)

This invention relates to filtering systems and particularly to an improved completely automatic filtering system capable of repetitive cycle operation with overriding manual controls.

In the operation of batch leaf filters, it has been difficult to adapt the same for automatic operation because of the many variables. As an example, the variables may include rate of supply of prefilt, variation of solids concentration, size of particles and viscosity of the filtrate or prefilt.

The principal object of the invention is to provide an automatic repetitive cycle filtering system.

Another object of the invention is to provide such a system in which a complete filtering cycle is automatically preformed including filtering, draining, blowing the filter cake to dry it, opening the filter, exposing the leaf assembly and vibrating the leaves to remove the cake.

Still another object of the invention is to provide such a filtering system in which the above described cycle can be performed repeatedly without stopping unless some malfunction occurs.

Another object of the invention is to provide such a filtering system in which a control is provided for stopping the process if the filter cake builds up to a predetermined thickness, draining the filter, drying the cake, exposing the leaf assembly, removing the cake, re-inserting the leaf assembly and restarting the process.

Still another object of the invention is to provide such a filtering system in which the cycle of stopping, draining, drying cake, exposing the leaf assembly, cleaning cake therefrom and restarting the process may also be initiated if a predetermined pressure differential occurs between the inside and outside of the leaves.

Another object of the invention is to provide such a system in which the above steps can be rendered effective after a predetermined lapse of time, i.e., the end of a day's operation.

Still another object of the invention is to provide such a system in which means is provided to cause the supply to the filter to bypass it in the event the supply tank level is below a predetermined amount.

Another object of the invention is to provide such a system in which means is provided for the system to fail safe.

In one aspect of the invention, a leaf filter may comprise an assembly of filter leaves mounted on a frame that is rigidly connected to one of the end plates of a tank, which end plate may be locked to the tank in sealed relation but may be released through power-operated means. The end plate supporting the leaf assembly may be supported on a tramway such that upon unlocking the end, it and the assembly of filter leaves may be withdrawn from the tank.

In another aspect of the invention, a vibrating device may be permanently attached to the end plate supporting the filter leaves so that when the assembly of leaves is outside of the tank, it may be employed to remove filter cake from the leaves.

In still another aspect of the invention, a supply tank may be connected by a line to the filter tank through a hydraulic pump, and the line may include a bypass valve arrangement so that the liquid to be filtered can be recirculated to the supply tank until an adequate supply has built up in the supply tank.

In still another aspect of the invention, a filter thickness gauge and a pressure differential transmitter may be employed to stop the filtering and remove the cake when either the gauge or transmitter is rendered effective.

In a further aspect of the invention, the filtrate may be recirculated ahead of the discharge for the tank in order to provide a precoat of a predetermined amount on the filter leaves.

In still another aspect of the invention, an electrical control circuit may be provided for singly or repetitively automatically operating the filtering system in accordance with a predetermined cycle, and in which the circuit includes overriding manual controls.

The above, other objects and novel features of the filtering system will become apparent from the following specification and accompanying drawings which are merely exemplary.

Figure 2:
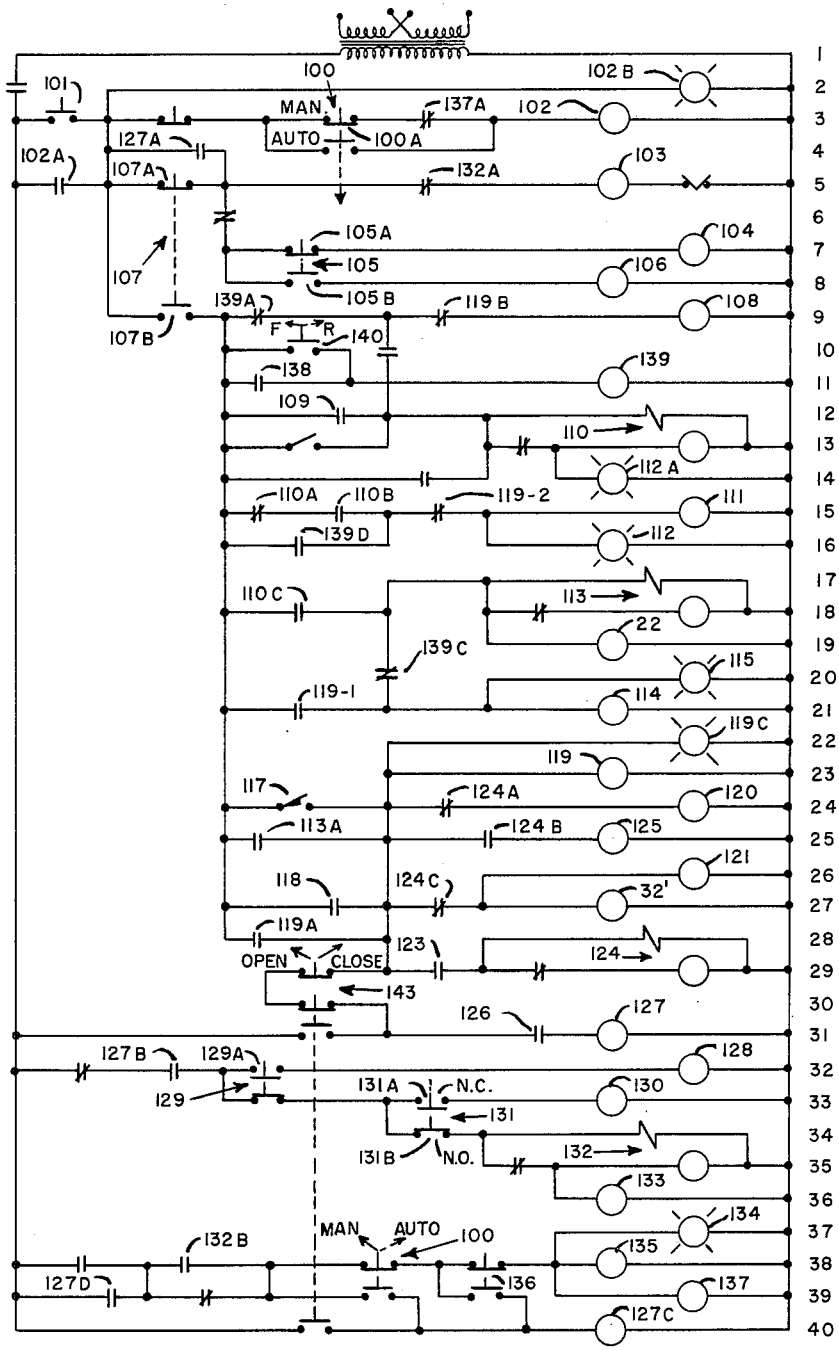

In the drawings:

FIG. 1 is a schematic view of a leaf filter system to which the principles of the invention have been applied; and FIG. 2 is a wiring diagram for controlling the operation of the system shown in FIG. 1.

Referring to the drawings, and particularly to FIG. 1, the principles of the invention are shown as applied to a filtering system including a leaf filter 10 comprising a hollow drum 11 having an integral, non-removable end plate 12 and a removable end plate or cover 13. The filter 10 may be of the type shown, described and claimed in United States Patents 2,841,308 to Weicker and 2,843,-267 to Anderson. The removable door or cover 13 may support the leaf assembly within the drum 11. A partially rotatable seal lock 14 may be employed to lock the cover 13 in sealing relation with the drum 11 in the manner shown in the aforementioned Weicker patent, by the rotation of a locking ring 15 due to the action of hydraulic means 16.

The cover 13 may be connected to a trolley 17 adapted to ride along a track 18 supported over and along the longitudinal axis of the drum 11. A cylinder and piston device 18' on drum 11 may be used to move the end cover 13 along track 18. From the foregoing it is evident that by operating the hydraulic means 16, locking ring 15 can be released by turning. By moving the trolley 17 along the track 18, the filter leaves attached to cover 13 can be exposed for cleaning of filter cake thereon or the repair thereof and then be replaced in drum 11.

A vibrator 19 may be attached to the exterior of the cover 13 and it may be pneumatically operated by a line 20 through a valve 133. The purpose of the vibrator, of course, is to remove cake from the filter leaves when the leaf assembly is removed from the interior of drum 11. Filter leaves 150 are carried on support 151 attached to the assembly. Link 152 will serve to transmit the vibrations provided by vibration producing means 19 to the assembly. Other types of vibrators can be used.

In order to render the system sensitive to the buildup of filter cake on the leaves, a thickness detector 22 may also be mounted on cover 13 or may be otherwise suitably mounted relative to the leaves so as to detect buildup thereon. While it may take several forms, one that is satisfactory is that shown, described and claimed in patent application Serial No. 66,769, filed November 2, 1960, now Patent No. 3,077,988.

A supply tank 23 may be supplied with material to be filtered through a line 24 at a predetermined rate. The tank 23 may be connected through a line 25 to a pump 26 driven by motor means not shown in FIG. 1.

The discharge from pump 26 flows through a line 27 to a two-way branch, one branch 28' returning to tank 23 through a valve 28, so that if the level in tank 23 gets too low, the material to be filtered can be recirculated to tank 23 until a suitable level in tank 23 is attained. The second branch line 29' leads through a valve 29 to an inlet 30 to drum 11, and inlet 30 is provided with a differential pressure transmitter 30' which is connected to and measures the pressure differential between the interior of the filter leaves and the interior of drum 11. This provides a control which becomes effective when the material to be filtered contains a high ratio of fines, causing the leaves to become inefficient before the buildup of cake actuates the cake thickness detector 22.

In order to dry the cake on the leaves prior to exposing the leaves for cake removal, it is desirable to supply a flow of air under pressure through the leaves. This is accomplished from an air line 31 and valves 32 and 32', the former controlling the recirculation of unfiltered material from within drum 11 through line 33 to tank 23. This recirculation is arranged so that the inflow is greater than the outflow or liquid passing through the leaves. The upflow in drum 11 will keep solids from settling. Another line 35 is connected to discharge 34 ahead of a discharge valve 36. The line 35 leads through a valve 37 back to the tank 23 and is used during the recirculation step to effect precoating of the leaves. When it is desired to drain drum 11, a valve 38 associated with inlet 30 is employed.

There is a third control for terminating the process and it is a timer rendered effective at the end of a desired run, for example, a day.

Referring to FIG. 2, an electrical "across-the-line" circuit is shown which will be described in connection with the system as it performs its cycle. The cycle includes (1) filling the drum 11, (2) recirculating the material in drum 11 to provide the desired precoat, (3) filtering the material to be treated, the duration of which is controlled by the thickness of the cake, time, or pressure drop between the interior of the leaves and that of drum 11, (4) draining the drum 11 to a predetermined level just below the bottom edges of the leaves, (5) blowing air through the leaves to dry the cake thereon, (6) draining the drum 11, (7) moving the cover 13 rightwardly for exposing the leaf assembly in drum 11, and (8) operating the vibrator 19 to remove the cake from the leaves. The cycle ends with the clean leaves in their extended position outside of the drum 11.

Referring to FIG. 2, with the manual-automatic switch 100 set on manual, depressing the start button 101 will cause the run light 102B to light. The relay coil 102 is energized through closed contact 100A and contact 102A closes. Current flows to the starter 103 for hydraulic pump 200 and "carriage-in" solenoid 104 is energized, such furnishing fluid under pressure to the cylinder 18'. The carriage moves in until the "carriage-in" limit switch 105 (FIG. 1) is contacted; then 105A opens and 105B closes, supplying current to "filter-close" solenoid 106 which furnishes fluid under pressure to cylinder 16. The locking ring 15 turns toward a closed position until "filter-close" limit switch 107 is engaged; then the contact 107A opens and 107B closes. This de-energizes the pump starter and the hydraulic pump 200 stops. Solenoid valve 108 is energized and process line 27 is switched from bypass 28' to 29', filling the filter. When the filter is filled, contact 109, schematically shown in FIG. 1, closes, starting time delay relay 110 and lighting amber precoat light 112A. Contacts 110A and 110B are closed, thereby lighting the blue (recirculate) light 112 and energizing solenoid valve 111, thus opening valve 37 and allowing the leaf outlet to circulate through lines 34 and 35 to tank 23 for precoating the leaves. Precoat continues until time delay relay 110 times out; solenoid valve 114 is energized, thus opening valve 36, and the filter is on stream in the "filter" phase by virtue of the opening of valve 36. At the same time, the green filter light 115 lights, and the cake thickness detector 22 starts. Contact 110A opens and solenoid valve 111 de-energizes, thus closing valve 37, and the blue and amber lights 112 are de-energized.

The filter cycle continues until time delay relay 113 times out, or the cake thickness detector 22 senses full loading, or the pressure drop contact 118 in differential pressure transmitter 30' (FIG. 1) senses maximum pressure differential across the filter media. At this time, 113A, 117 or 118, respectively, will close, locking the circuit through relay 119 and contact 119A, and the clear "drain-blow" light 119C will light. Solenoid valve 120 will be energized, opening drain valve 38 to a metered position; solenoid valve 121 will be energized closing valve 32, thus closing the filter bleed line; solenoid valve 32' will be energized, opening the air blow line; and contact 119B will open and de-energize solenoid valve 108, thus opening valve 28 and closing valve 29, switching the process line flow from fill to bypass.

"Drain-blow" continues until the liquid level in the filter drops to a preset level when contact 123 closes and starts time delay relay 124. At this time, contact 124A opens and de-energizes solenoid valve 120, thus closing drain valve 38 from metered position. "Blowdown" continues until time delay relay 124 is timed out; then contact 124C opens and solenoids 121 and 32' are de-energized, allowing the filter bleed line to open and the "air blowdown" line to close. Contact 124B closes and solenoid 125 is energized, thereby opening the drain valve 38 to full open.

When the filter is empty, contact 126 closes and energizes relay latch coil 127. This, in turn, starts the hydraulic pump 200 through contact 127A and through contact 127B, and energizes the "filter-open" solenoid 128 so as to furnish fluid under pressure to cylinder 16.

The locking ring 15 starts to unlock and disengages the "filter-close" limit switch 107. Contact 107B opens and all points 108 through 127 become de-energized. When the locking ring 15 engages the "filter-open" limit switch 129, contact 129A opens, de-energizing the "filter-open" solenoid 128, and contact 129B closes, energizing the "carriage-out" solenoid 130 to furnish fluid under pressure to cylinder 18' which starts the "carriage-out" travel. When the carriage engages the "carriage-out" limit switch 131, contact 131A opens and de-energizes "carriage-out" solenoid 130; contact 131B closes and starts time delay relay 132 and energizes vibrator air solenoid 133 to admit air through line 20 to vibrator 19. Relay contact 132A opens and stops the hydraulic system.

When the time delay relay 132 is timed out, the red "stop" light 134 comes on and buzzer 135 signals the operator to inspect the filter as required. Relay 137 is energized and opens contact 137A by de-energizing 102, opening contacts 102A which de-energizes all points through 127. The operator can stop the signal by depressing the "signal-off" button 136 which, in turn, energizes the relay unlatch coil 127C, contact 127B then opening and de-energizing time delay relay 132 which then resets.

At this point, all controls are set to repeat the full cycle by pressing the start button 101.

Should it be desired automatically to repeat the above described cycle of the eight steps previously referred to, switch 100 is turned from manual to automatic and the operation will be the same as that described above, to the point where time delay relay 132 times out, whereupon contact 132B closes, energizing relay 127C, closing contact 127A and opening contacts 127B and 127D which will, in turn, cause time delay relay 132 to reset. When time delay relay 132 resets, contact 132A closes and starts hydraulic pump 200, thus beginning another cycle of operations as described previously.

Should the level of liquid in tank 23 fall below a predetermined level, contact 138 closes. If this low level occurs during the filling of the drum 11, relay 139 is energized, opening contact 139A de-energizing solenoid 108, actuating valves 28, 29 (FIG. 1) to cause the bypass to become effective until a predetermined level in tank 23 is achieved whereupon contact 138 opens. If this low level in tank 23 occurs during the filtering operation, relay 139 is energized, opening contacts 139C, thereby de-energizing solenoid valve 114, causing valve 36 to close. Energizing of relay 139 also closes contacts 139D, energizing solenoid valve 111, causing valve 37 to open whereupon the liquid recirculates back to supply tank 23. When the level in tank 23 reaches a predetermined value, contacts 138 open, de-energizing relay 139, opening contacts 139D thereby stopping recirculation and restarting the filtering operation.

Should it be desired to recirculate the liquid while the drum 11 is being filled, switch 140 can be turned from "filter" to "recirculate." This energizes coil 139, causing contacts 139A to open, de-energizing solenoid 108 actuating valves 28, 29, causing the "fill" valve 29 to close and the "bypass" valve 28 to open. Flow will continue to bypass the filter until switch 140 is returned to the filter position.

Should it be desired to recirculate the liquid while the filtering operation is in process, then switch 140 is turned from "filter" to "recirculate"; relay 139 is energized; contacts 139D close and solenoid valve 111 is energized, causing recirculating valve 37 to open; and contacts 139D open, de-energizing solenoid valve 114, causing the "filter" valve 36 to close. Therefore, the liquid will recirculate through the filter back to tank 23.

Should it be desired to expose the filter leaves, the switch 143 is employed to change the direction of carriage travel as indicated, provide it is actuated before the carriage reaches the limits of its travel. This switch 143 can be used in conjunction with the start button 101 and the signal off button 136 to jog the carriage to a desired position, and stop its movement by depressing and releasing the signal off button 136.

Although the various features of the improved filtering system have been shown and described in detail to fully disclose one embodiment of the invention, it will be evident that changes may be made in such details and certain features may be used without others without departing from the principles of the invention.

What is claimed is:

1. In a filtering system including a leaf filter having filter leaves and comprising a drum having a removable cover and a filter leaf assembly supported on means connected to said removable cover, means for moving said cover and leaf assembly relatively to and from said drum, and vibration means connected to the support for said filter leaf assembly, the combination comprising filter cake thickness detecting means; differential pressure transmitting means for detecting the pressure between the interior of the leaves and the interior of the drum; timer means; and means responsive to the operation of any of said detecting, pressure and timer means for causing said drum to drain, said cover to be moved to an open position and said leaf assembly removed from said drum, and said vibration means to become effective to remove filter cake from said leaves.

2. In a filtering system including a leaf filter having filter leaves and comprising a drum having a removable cover and a filter leaf assembly supported on means connected to said removable cover, means for moving said cover and leaf assembly relatively to and from said drum, and vibration means connected to the support for said leaf assembly, the combination comprising filter cake thickness detecting means; differential pressure transmitting means for detecting the pressure between the interior of the leaves and the interior of the drum; timer means; means responsive to the operation of any of said detecting, pressure and timer means for causing said drum to drain, said cover to be moved to an open position, said leaf assembly to be removed from said drum, and said vibration means to become effective to remove filter cake from said leaves; and means responsive to the operation of said vibrating means for moving said cover toward said drum, thereby relocating said filter leaf assembly within said drum.

3. In a filtering system including a leaf filter having filter leaves and comprising a drum having a removable cover and a filter leaf assembly supported on means connected to said removable cover, means for moving said cover and leaf assembly relatively to and from said drum, and vibration means connected to the support for said leaf assembly, the combination comprising filter cake thickness detecting means; differential pressure transmitting means for detecting the pressure between the interior of the leaves and the interior of the drum; timer means; means responsive to the operation of any of said detecting, pressure and timer means for causing said drum to drain, said cover to be moved to an open position, said leaf assembly to be removed from said drum, and said vibration means to become effective to remove filter cake from said leaves; means responsive to the operation of said vibrating means for moving said cover relative to said drum, thereby relocating said filter leaf assembly within said drum; and means responsive to the movement of said cover to said drum for filling said drum with a slurry to be filtered.

4. In a filtering system including a leaf filter with filter leaves and comprising a drum having a removable cover and a filter leaf assembly supported on means connected to said removable cover, means for moving said cover and leaf assembly relatively into and out of said drum, and vibration means on said cover, the combination comprising filter cake thickness detecting means; differential pressure transmitting means for detecting the pressure between the interior of the leaves and the interior of the drum; timer means; means responsive to the operation of any of said detecting, pressure and timer means for causing said drum to drain, said cover to be moved to an open position, said leaf assembly to be removed from said drum, and said vibration means to become effective to remove filter cake from said leaves; means responsive to the operation of said vibrating means for moving said cover relative to said drum, thereby relocating said filter leaf assembly within said drum; means responsive to the movement of said cover relative to said drum for filling said drum with a slurry to be filtered; and means responsive to the filling of said drum for causing the slurry with which it was filled to recirculate to provide a precoat on said filter leaves.

5. In a filtering system including a leaf filter and filter leaves comprising a drum having a removable cover and a filter leaf assembly supported on means connected to said removable cover, means for moving said cover and filter leaf assembly to and from said drum, and vibration means on said cover, the combination comprising filter cake thickness detecting means; differential pressure transmitting means for detecting the pressure between the interior of the leaves and the interior of the drum; timer means; means responsive to the movement of said cover and leaf assembly relative to said drum for causing said drum to be filled with slurry to be filtered; means responsive to the filling of said drum for recirculating the slurry to precoat said leaves for a timed period; means responsive to the timing out of said precoat timer for filtering said slurry; and means responsive to the operation of any of said detecting, pressure and timer means for causing said drum to drain, said cover to be moved to an open position, said leaf assembly to be removed from said drum, and said vibration means to become effective to remove filter cake from said leaves.

6. In a filtering system including a leaf filter comprising a drum having a removable end plate on which the filter leaves are mounted, means for moving said end plate and leaves from and to said drum, and vibration means on said end plate and connected to said filter leaves, the combination comprising filter cake thickness detecting means; differential pressure transmitting means for detecting the pressure between the interior of the leaves and the interior of the drum; timer means; means responsive to the movement of said end plate and leaves to said drum for causing said drum to be filled with slurry to be filtered; means responsive to the filling of said drum for recirculating the slurry to precoat said leaves for a timed period; means responsive to the timing out of said precoat timer for filtering said slurry; means responsive to the operation of any of said detecting, pressure and timer means for causing said drum to drain, said end plate to be moved to an open position removing said leaves from said drum, and said vibration means to become effective to remove filter cake from said leaves; and means responsive to the operation of said vibration means for moving end plate to said drum, thereby relocating said filter leaves within said drum.

7. In a filtering system including a leaf filter comprising a drum having a removable end plate on which the filter leaves are mounted, means for moving said end plate and leaves from and to said drum, and vibration means on said end plate and connected to said filter leaves, the combination comprising filter cake thickness detecting means; differential pressure transmitting means for detecting the pressure between the interior of the leaves and the interior of the drum; timer means; means responsive to the movement of said end plate and leaves to said drum for causing said drum to be filled with slurry to be filtered; means responsive to the filling of said drum for recirculating the slurry to precoat said leaves for a timed period; means responsive to the timing out of said precoat timer for filtering said slurry; means responsive to the operation of any of said detecting, pressure and timer means for causing said drum to drain, said end plate to be moved to an open position removing said leaves from said drum, and said vibration means to become effective to remove filter cake from said leaves; and means responsive to the removal of cake from said leaves for initiating said cycle again.

References Cited by the Examiner
UNITED STATES PATENTS

| | | | |
|---|---|---|---|
| 2,841,308 | 7/58 | Weicker | 220—40 |
| 2,843,267 | 7/58 | Anderson | 210—263 |
| 2,874,848 | 2/59 | Cannon et al. | 210—347 X |
| 2,901,115 | 8/59 | Schmidt et al. | 210—331 |
| 2,912,110 | 11/59 | Stoltenberg | 210—86 X |
| 2,969,148 | 1/61 | Hirs | 210—108 |
| 2,975,903 | 3/61 | Ulrich | 210—236 |
| 2,993,599 | 7/61 | Moon et al. | 210—193 X |
| 3,043,434 | 7/62 | Stram et al. | 210—108 X |
| 3,077,988 | 2/63 | Anderson et al. | 210—86 |

REUBEN FRIEDMAN, *Primary Examiner.*

HERBERT L. MARTIN, *Examiner.*